Inventor
CARLO ERNESTO VALENTE
BY
Silverman & Coss
ATTYS.

United States Patent Office 3,364,842
Patented Jan. 23, 1968

3,364,842
VOLUMETRIC METERING DEVICE FOR COFFEE MACHINES
Carlo Ernesto Valente, Via G. Ventura 5, Milan, Italy
Filed Jan. 21, 1966, Ser. No. 522,234
Claims priority, application Italy, Jan. 22, 1965, 1,466/65
12 Claims. (Cl. 99—298)

This invention relates to infusion type coffee making apparatus and more particularly provides a novel volumetric fluid metering device for coffee making apparatus of the type in which the delivery fluid pressure applied to coffee powder contained in the filter is generated by pump means disposed on the inlet side of the receptacle in which the infusion fluid is heated, said device comprising a hollow body having movable pistion dividing same into a pair of chambers, control means are provided for selectively varying the movement of the piston to vary the amount of beverage delivered and fluid switch means are provided for selectively directing fluid to said metering device's chambers.

Infusion type coffee making apparatus concerned herein are those wherein an infusion fluid, such as water, is heated and forced under fluid pressure through coffee powder contained in a suitable filter container or holder. In conventional apparatus of this type which is utilized to prepare and dispense the coffee beverage in cup quantities, the necessary metering of the quantity of beverage to be supplied to the cup is carried out by removing the desired quantity of water by means of a syringe-like device from a water heater and forcing this quantity of water through the container holding the coffee powder.

Prior devices of this general type are found to have certain disadvantages. These include cooling of the selected quantity of infusion fluid in the syringe-like device during the duration of time taken for delivery. Since this time generally is at least 30 seconds, the inevitable dispersion of the heat from this fluid is present, and hence there is an undesired variation in temperature during the infusion process. Also, the syringe-like device or cylinder is subjected to varying temperatures during the delivery and nondelivery periods, hence causing an undesired variation in the amount of play between the moving parts. Other disadvantages include the operation of the sealing gaskets involved under hot conditions, the impossibility of obtaining delivery of a quantity of fluid exceeding the limits permitted by the stroke of the piston, which stroke is limited to avoid taking excessive space and having an excessive mass to be heated, as well as being subjected to heat loss. The quality of the beverage obtained is influenced deleteriously by the fact that it is exceedingly difficult to keep the speed of delivery relatively constant.

Applicant herein has provided several structures designed to avoid the above mentioned disadvantages and to secure the production of the coffee beverage by continuous delivery so that the fluid required to prepare the beverage is conveyed in such a way as to gradually percolate into the coffee powder in the filter container and then be delivered under suitable pressure. Accordingly, in those instances, as soon as a suitable delivery cock is opened, the delivery of the beverage is initiated and can be stopped by human intervention, such as by closing the cock. To avoid manual operation of such last mentioned devices, applicant has heretofore provided time controlled devices which after a predetermined interval of time automatically closed the delivery cock. However, such systems as heretofore provided nevertheless were not capable of reliable metering of the fluid. To provide reliable metering, volumetric metering devices, such as a chamber having a moving wall or piston therein, were also suggested but were inserted between the hot infusion water receptacle and the delivery cock as the only alternative solution to continuous delivery with the obvious complications involving a complex valve system. A key disadvantage of such solution is that the infusion fluid is cooled during the period it remains in the metering chamber. This requires the provision of subsidiary means for restoring the quantity of fluid to the required temperature. Also, there is the further disadvantage that when the last coffee beverage has been prepared, there remains on one side of the moving wall or piston, a quantity of fluid which must be discharged and wasted when it is desired to make a further dispensation of coffee beverage.

Accordingly, it is the principal object of this invention to provide a novel volumetric metering device for a coffee making apparatus of the infusion type wherein the delivery pressure is generated by a pump disposed on the inlet side of the receptacle in which the infusion fluid is heated, said device being disposed between the pump and the inlet side of said receptacle, it being intended thereby to substantially eliminate the heretofore enumerated disadvantages encountered with use of prior coffee making apparatus by operating upon the cool fluid to deliver an equivalent metered hot fluid to the coffee powder holder through a delivery cock.

Another object of this invention is to provide a volumetric fluid metering means for an infusion type coffee making apparatus which comprises a hollow differential cylinder having a movable wall or piston dividing the same into a pair of chambers each of which has a port, one chamber being connected to receptacle means for heating infusion fluid and the other being connected to a source of said fluid, adjustable stop means arranged to selectively vary the movement of said piston to so vary the volume of fluid supplied to said receptacle means, thereby metering the beverage supplied from said apparatus.

A further object of the invention is to provide means for converting, interchangeably, the apparatus from a metered delivery to a continuous delivery of beverage.

A still further object of the invention is to provide, in an apparatus of the character described, a volumetric fluid metering means which is of simple construction and operation; which is versatile; and which is economical to service and repair.

Other objects and advantages of the invention herein will be evident in a detailed description of a preferred embodiment of the invention proceeds hereinafter with reference to the accompanying drawing wherein.

The invention herein provides a coffee making apparatus of the infusion type having one or more delivery cocks, to each of which a receptacle is coupled to feed the cocks; in which apparatus the delivery of a single pump fed from an exterior source of fresh water, such as the common water mains, is connected to the inlet side of each of the said receptacles. Each of the said receptacles is provided with means for heating its contents. Each of these receptacles communicate, under seal, through a manually operable delivery cock, with a filter container for holding the coffee powder.

The metering device characterizing the invention comprises a hollow differential cylinder body having a pair of chambers defined by a movable wall therein and said metering device being disposed between the pump means and the inlet side of said receptacle. Means are provided linked to the manual operating device for the delivery cock to control the movement of said moving wall, including means for varying the extent of the movement of said manual wall, such means being linked or capable of being linked by conventional means to the operating device for the said delivery cock so that the operation of said delivery cock closes and opens in the familiar manner that a switch controls an electrical circuit, say, of the pump.

Figure 1:
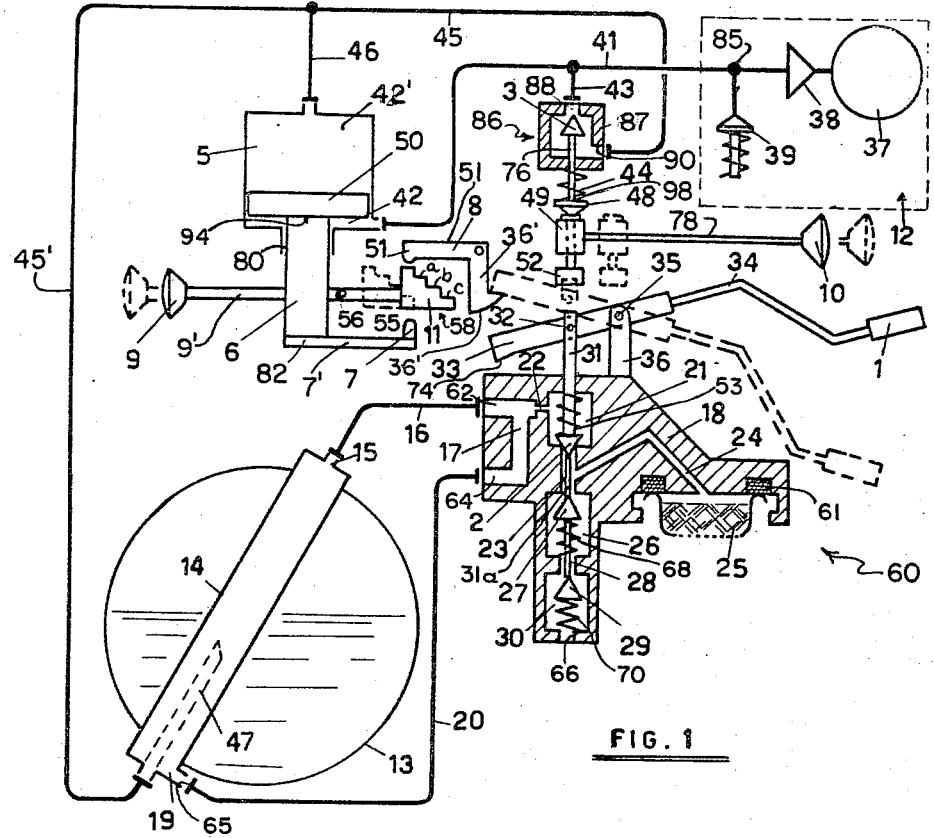
FIG. 1 is a diagrammatic representation of a coffee making apparatus incorporating the volumetric fluid metering device in accordance with the invention, said representation being partially in section and partially in schematic notation.

Referring now to the drawing, one arrangement of the various elements in accordance with the invention is represented diagrammatically in FIG. 1. The coffee making apparatus shown generally by reference numeral 60 and includes an infusion head or body 18 comprising a delivery cock. Said body 18 is connected to receptacle or a heat exchanger means 14 encased in a boiler means 13. Means 14 is adapted to receive water from a source of fluid such as a common water main (not shown) through a pump means 12 and having the fluid metering means 5 of the invention arranged between the pump means 12 and the inlet end 19 of the receptacle means 14. A fluid switch consisting of bypass valve means 86 is provided connected to the delivery line from pump means 12 and between the latter means and said metering means 5. Suitable valve means 2, 27, 29 are provided for chambers 21, 26 and 30 formed in the infusion head 18 and suitable manually operated lever means 1, 34, 33 also are provided to alternate the valve means 2, 27 and 29 between delivery and non-delivery conditions. First control means 10, 49, 52 is provided to selectively operate the bypass valve means 86 and a stepped second control means 8, 11, 51, 7, 6 and 9 is provided for controlling the stroke of piston 50 of the volumetric metering means 5 between preselected limits, said first control means being mechanically linked to the operation of the said lever means.

In FIG. 1, reference numeral 13 diagrammatically represents generally the shell of a conventional steam boiler. Arranged diametrically through said boiler 13 in a direction somewhat inclined to the vertical, there is shown, also diagrammatically, a cylindrical receptacle or heat exchanger means 14 arranged to receive fluid and being, disposed substantially entirely within said shell 13 but having its ends 15 and 19 projecting therefrom. In this manner, the receptacle 14 functions as heat exchanger means for the infusion fluid. The receptacle 14 communicates through conduit 16 in the upper leg 62 of U-shaped chamber 17 formed in the dispensing head 18 of coffee making apparatus 60. The receptacle 14 communicates with the lower leg 64 of said chamber 17 by means of return conduit 20 through port 65.

The dispensing head 18 has, in addition to chamber 17 formed therein, an upper chamber 21 which communicates with upper leg 62 of chamber 17 through a calibrated passageway 22 and has a discharge passage 23. Discharge passage 23 is intercepted by an elongate channel 24 formed in body 18 opening to the filter container or holder 25 having the powdered or ground coffee therein. The holder 25 is removably disposed in sealing relationship with the dispensing head 18 under said opening of channel 24. Sealing means 61 are provided to assure a sealed relationship between the body 18 and the lips of holder 25. Holder 25 may be slidably or otherwise detachably engaged in its position relative to body 18 in a manner well known to the art.

Two additional chambers, coaxially arranged relative to the upper chamber 21 and each other, are provided in body 18, namely, intermediate chamber 26 and lower chamber 30. As stated above upper chamber 21 communicates with the upper leg 62 of chamber 17 through calibrated passageway 22. Chamber 21 communicates with intermediate chamber 26 through passageway 23 and chamber 26 communicates with lower chamber 30 through passageway 28, chamber 30 communicating to the atmosphere through opening 66. A plurality of spring biased valves 2, 27 and 29 are provided to control passage of fluid through passageways 23 and 28.

Referring to FIG. 1, the apparatus is shown in its non-delivery condition with the valve 2 biased by spring 53 into a normally closed position blocking passage of fluid from chamber 21 into passageway 23. Valve 27 is biased by spring 68 so that it is normally open permitting communication through passageway 23 into chamber 26. Valve 29 is normally biased by spring 70 to open position permitting communication between chambers 26 and 30. Hence, in the normal or non-delivery condition of the apparatus 60, the interior of holder 25 communicates to the atmosphere through passageway 24, the lower portion of passageway 23, chamber 26, passageway 28, chamber 30 and opening 66. Valves 27 and 29 are mounted on a common spindle 31a depending from valve 2. Valve 2 is mounted at the base of spindle 31, same arranged to extend outwardly from body 18, through passageway 72 and appropriate sealing means not shown outward from body 18.

When no beverage is being delivered, the valve 2 under the influence of spring 53 closes the passageway 23 and, presses upon the spindle 31a of valves 27 and 29 and maintains both valves 27 and 29 in the open position. The cross section of spindle 31a is of a Maltese Cross configuration thereby while the spindle 31a can be reciprocably moved in vertical orientation within passageways 23 and 28, said spindle 31a remains properly centered in said passageways while permitting passage of fluid between the respective surfaces thus the disposition of the spindle 31a through passageways 23 and 28 does not block said passageways.

The spindle 31 which extends sealingly through opening 72 of body 18 is provided with a hinged joint at 32 and secured thereat to operating lever 33. Lever 33 has an extension 34 secured thereto and extension 34 is provided with an offset handle 1 secured thereto. Lever 33 pivotally is secured to the upper portion of a support 36, the lower portion of which is secured to body 18 and extends outward from body 18 in a direction substantially parallel to the spindle 31. The apparatus 60 operated by lowering the handle 1 from its normal, non-delivery position shown in solid lines, to the delivery position shown in dotted lines in FIG. 1. Lowering of the handle 1 causes the lever 33 to pivot at 35 and draws spindle 31 outward from body 18, opening valve 2 and closing valves 27 and 29. The hot infusion water from heat exchanger 14 passes from chamber 17 through calibrated passageway 22 into the upper chamber 21 and thence along the passageway 23 into channel 24 until it reaches the coffee powder contained in the filter holder 25.

In order to force the infusion water through the powdered coffee contained in filter container 25, a considerable resistance of the finely ground and slightly compressed coffee powder in the filter 25 must be overcome. Hence the hot fluid which enters the chamber 25 from channel 24 reaches the ground coffee in chamber 25 but does not succeed in passing therethrough. The pressure in channel 24 rises until, when the fluid pressure of about 1.5 kilogram per square centimeter has been reached, the valve 27 opens as such fluid pressure is sufficient to overcome the bias of spring 68. However valve 29 remains closed. Now the water passing through calibrated passageway 22 fills the chamber 26. Chamber 26 has a preselected volume capacity requiring a certain predetermined time to fill. During this predetermined time period the hot water wets the ground coffee but does not percolate therethrough since the fluid pressure interior of the holder remains at about 1.5 atmospheres until the chamber 26 is filled. Once intermediate chamber 26 has been filled, the fluid pressure in channel 24 starts rising again. When about 7 to 8 kg. per square centimeter, delivery of the beverage begins.

When handle 1 is lowered to place the machine in delivery condition, a notch 74 provided at the end of lever 33 is caught upon hook means 36' to be later described; hence the valve 2 remains open and the apparatus 10 is maintained in its delivery condition. The hook means 36' is provided by one arm 36 of a bell-crank lever 8 pivotally arranged on the frame (not shown) of the apparatus 60 and is biased in a normally counter-clockwise rotational direction by a conventional spring (not shown).

Having now described in detail the delivery unit of the coffee making apparatus 60, attention can now be directed to the other novel elements of the invention.

The pump unit 12 preferably is of the continuous operation type and comprises a pump 37, the delivery end 84 of which is provided with a non-return valve 38 and an expansion valve 39 having an expansion chamber 40. A delivery conduit 41 communicates between the delivery end 84 of the pump means 12 and a lower chamber 42 of differential cylinder 5. Differential cylinder 5 is provided with a moving wall or piston 50, provided with suitable sealing means (not shown) and is reciprocally movable therewithin to define chambers 42 and 42'. The normal position of the piston 50 is where the chamber 42, or lower chamber, is of smaller volume than chamber 42'. Fluid entering the chamber 42 from delivery conduit 41 will cause the piston to rise, discharging any material in chamber 42' through connecting pipe 46 into the line 45 and 45'.

Bypass valve means 86 is provided which includes a suitable hollow housing 87 an entry port 88 and outlet port 90 and a valve 3 mounted on spindle 76 and arranged normally in open condition to permit passage of fluid through said housing 87. Said valve means 86 is connected to the delivery conduit 41 between the pump means 12 and the chamber 42 by means of branch conduit 43. The valve 3 is normally held open by the pressure of a spring 44 and hence fluid can continuously pass from the pump means 12 through delivery conduit 41, then through conduit 43, entry port 88, the interior of housing 87, outlet port 90 through conduit 45 and through the branch conduit 46 to feed into chamber 42'. Once chamber 42' has been filled, the fluid by-passes branch conduit 46 and follows along the straight continuation 45' of conduit 45 and enters the heat exchanger 14 via nozzle 47 opening at a predetermined height inside the heat exchanger 14. With valve 2 closed, the fluid, heated within heat exchanger 14, passes through port 15 thereof and, into chamber 17 by way of upper leg 62 thereof and thence through chamber 17 and lower leg 64 thereof to recirculate into the heat exchanger 14 by way of conduit 20 and port 65. So long as valve 3 is open, fluid will be circulated through the system described. The valve 3 and its spindle 76 is connected to collar 48 at its terminal end 42 and is aligned vertically with the valves 2, 27 and 29 and their respective spindles 31 and 31'. Between the collar 48 and the upper end of spindle 31 of valve 2, a transversely movable catch 52 can be interposed. When interposed, the catch 52 is positioned in the path of movement of spindle 31 so that when the spindle 31 is raised as lever 33 is moved from the normal non-delivery position (solid lines) to the delivery positioin (dotted lines) by manipulation of handle 1, the valve 3 is moved from its normal open position relative port 88 to a closed position thereby blocking entrance of fluid from the pump 12 through conduits 41 and branch conduit 43 and causing the fluid to flow directly through delivery conduit 41 to the chamber 42 of cylinder 5.

The catch 52 is arranged for vertical movement against the bias of spring 44, guide means 49 therefor being provided. Such guide means 49 and catch 52 is movable transversely, at right angles to the axis of said valves 3, 2, 27 and 29 by means of a rod 78, one end of which is secured thereto and the opposite end of said rod 78 being provided with a knob or handle 10. As seen in FIG. 1, the catch 52 can be withdrawn from the path of the spindle 31 to an inactive position so that actuation of handle 1 has no effect upon the valve 3 and continuous delivery of fluid to the dispensing head 18 and continuous delivery of beverage from holder 25 is possible.

The cylinder 5 is provided with an opening 80 at the base thereof through which a shaft 6 is slidably, sealingly engaged. Said shaft is secured at one end 94 thereof to piston 50 and has a plate 7' secured thereto opposite end 82. Thus when piston 50 moves within cylinder 5, the shaft 6 likewise moves in the same direction carrying therewith plate 7. The other arm 51' of the bell-crank lever 8 is provided with a contact 51. Arm 7' terminates in a contact piece 7 which is aligned with contact 51 of arm 51' of bell-crank lever 8. Movement of the piston 50 therefore causes movement of contact piece 7 toward contact piece 51 of arm 51'. The distance between the two contact pieces 51 and 7 is at its maximum when the piston 50 is disposed in its lowest position. A stepped member 11 is arranged on one end of a shaft 55 which, in turn, is pivoted at 56 so that said stem member can be rotated upward but not downward. Said shaft 55 also is secured at pivot 56 to an elongate rod 9' and is arranged for movement in a direction transverse to said pivot axis by manipulation of rod 9', the free end of which is provided with a knob 9. The position of step member 11 shown in solid lines in FIG. 1 and results in the minimum volume of delivered beverage while the fully withdrawn position is shown in dotted lines and results in the maximum volume metered delivery. The steps 11a, 11b, 11c define portions of gradually increasing width which can be selectively interposed between contact piece 7 and contact piece 51. Depending upon which step of stepped member 11 is interposed between said contact pieces 7 and 51, the upward movement of the piston 50 due to fluid entering chamber 42 carries the contact piece 7 a selected distance until contact 7 moves against the stepped member 11 and bears against contact piece 51 of the bell-crank lever 51, thereby causing a clockwise movement of the lever 8 in the direction of arrow 58 until the lever 33 is released from engagement with the hook means 36' of leg 36. The travel of piston 50 within cylinder 5 determines the volume of fluid forced from the cylinder 5 through conduits 46 and 45', the heat exchanger 14 into the dispensing head 18 and delivered eventually at holder 25.

The operation of the novel volumetric fluid metering device should now be readily understandable. A brief explanation, however may be in order. In FIG. 1, there is represented in solid lines the disposition of the various elements in their non-delivery position. The handle 1 is upraised and the lever 33 is closest to dispenser head 18. The spindle 31 is positioned so that valve 2 is closed. The valve 3 is in its open position and the specific pressure due to the pump is equal on both the upper and lower faces of piston 50 and cylinder 5. Owing to the differential in the cylinder 5 in which the piston moves up and down, the piston 50 is at the point of bottom dead center as the total pressure on the upper face thereof exceeds that on the lower face and chamber 42' is filled with fluid. Hot fluid is recirculating along a path taken through heat exchanger 14, port 15, conduit 16, leg 62, chamber 17, leg 64 conduit 20 and port 19. The knob 10 is assumed to be arranged in position to place catch 52 in intercepting relation to spindle 31. Rod 9' is arranged so that the step member 11 is disposed with its maximum dimension between contacts 7 and 51.

Now the handle 1 is lowered to move same from the non-delivery position, to the delivery position. The lever 33 is raised and brought into hooked engagement with hook means 36' leg 36 of bell-crank 8 since the end of said lever 33 bears against the cam surface provided at the end of leg 36 to move the lever 8 clockwise against its normal bias and thence the leg 36 returns to enable the hook means 36' to engage lever 33 at end 74 thereof.

Movement of the handle 1 also causes the spindle 31 to be raised and thus opens valve 2. Therefore there is a slight reduction of pressure within chamber 17, in the heat exchanger 14 in the conduits 45' and 46 and in the upper chamber 42' of the differential cylinder 5. Also the spindle 31 being lifted outward from body 18 presses against catch 52 lifting the same so that this in turn has closed the valve 3 against the bias of spring 44.

The pump means 12 therefore now operates only on the lower chamber of the differential cylinder 5 and causes the piston 50 to move displacing the water in the upper chamber 42 of said cylinder 5 and conveys it to replace in the volume which has been delivered from the heat exchanger 14 through chamber 17. The piston continues to move against the body of fluid in chamber 42' until the contact piece 7, likewise being raised, comes into contact with the step member 11 and urges the member 11 against the contact piece 51 of arm 51' of bell-crank lever 8 The lever 8 then rotates on its pivot against its bias releasing lever 33. Upon release of lever 33 and under the influence of spring 53, the valve 2 is closed. No beverage is now delivered and the original condition has been restored.

The invention, in the form described, that is in which only one travel of the moving wall is used, makes it possible to prevent any waste of water as the water intended to displace the wall remains in the cycle when delivery has been completed and makes it an easy matter to adjust the quantity to be delivered each time.

It is obvious that if, instead of assuming that the step member 11 is in the position shown by the full lines, it is assumed to be in the position shown by the dotted lines, the piston 50, before causing the release of lever 33 and the consequent closing of valve 2, will have to travel a greater distance and hence the quantity of fluid metered and delivered would be correspondingly greater.

Also, if instead of the assumed position of knob 10 shown with full lines in FIG. 1, this knob 10 is arranged to occupy the position shown by the dotted line, the opening of the valve 2 which permits delivery of the beverage would no longer have any influence whatsoever on valve 3 and valve 3 would remain open. Under such circumstances the pump would continue to act on both faces of the differential piston which would remain stationary at its point of bottom dead center while the pump would continuously deliver fluid to the heat exchanger to take the place of the quantity of infusion water continuously delivered. Hence the metering device of the invention can be short circuited and continuous delivery of beverage obtained.

Figure 2:
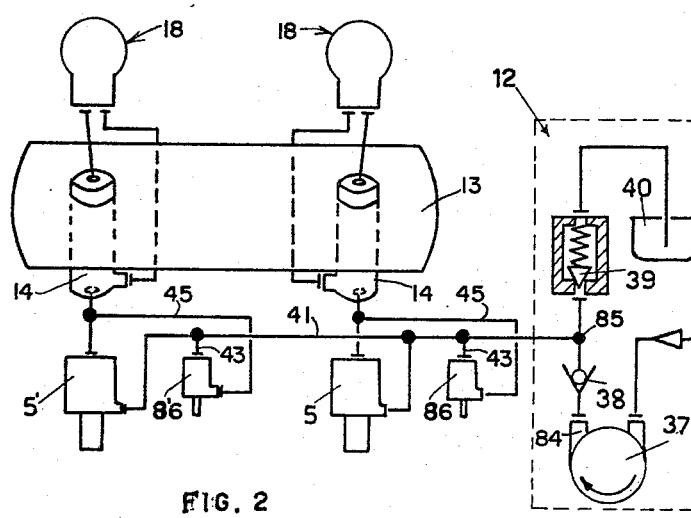
FIG. 2 is a schematic representation of a coffee making apparatus incorporating the invention therein and utilizing a pair of delivery cocks or heads.

In FIG. 2, there is shown a representation of the apparatus of the invention wherein two dispensing head means 18 are provided operated from the same pump means 12. Here a branched conduit feeds a pair of heat exchangers 14 through a pair of valve means 86, a pair of differential cylinders 5 to the pair of dispensing heads. The structure shown represented in FIG. 1 is simply duplicated except for use of a common pump means 12 and a common boiler 13. The volume of beverage dispensed from the heads 18 can be varied independently and, as well one head may be placed in a continuous delivery condition while the other head dispenses metered quantities. Obviously the number of dispensing heads are not limited although each head must have its own metering cylinder 5, heat exchanger 14, valve means 86, stepped member 11, catch 52 and handle.

While a preferred embodiment of the invention has been described it is intended that variations in the construction, size, configuration, and arrangement of the respective elements may occur to the skilled artisan without departing from the intended spirit and scope of the invention as defined in the claims appended hereto.

I claim:

1. In a coffee making apparatus of the infusion type which is provided with at least one delivery head and a heated receptacle for each said delivery head sealingly and communicatively coupled thereto, pump means for supplying infusion fluid to each receptacle from a common source of fluid, each delivery head including manually operated dispensing means for delivering heated infusion fluid received from the receptable to a filter holder having coffee powder therein, said infusion fluid being delivered to said filter holder under a head of fluid pressure sufficient to cause the fluid to percolate through said coffee powder for dispensing of coffee beverage therefrom, the invention comprising, a volumetric fluid metering device for each receptacle arranged between the pump means and the inlet of the receptacle, said fluid metering device comprising a hollow body having a movable piston sealingly engaged interior thereof for reciprocable movement therein, said piston dividing said hollow body into a pair of chambers and each chamber having a port communicating to the exterior thereof, first conduit means leading from the pump means to one chamber of said hollow body and second conduit means leading from the other chamber of said hollow body to the inlet of said receptacle, control means linked mechanically to the manually operated dispensing means to selectively vary the limit of movement of said piston within said hollow body whereby a preselected volume of hot infusion fluid, equivalent to the volume of fluid discharged from said other chamber during the limited movement of the piston within said hollow body, is delivered to the coffee powder.

2. The apparatus as claimed in claim 1 wherein said control means comprises fluid switch means adapted to be operatively coupled to said first conduit means, said fluid switch means comprising a hollow body having an inlet and an outlet, spring biased valve means interior of said hollow body at the inlet thereof and normally biased to open said inlet whereby to receive the fluid from the pump means diverting said fluid from entering said one chamber, third conduit means coupling the outlet of said hollow body to the other of said chambers, and catch means adapted to be interposed between said valve means and said manually operated dispensing means to close said valve means upon actuation of said manually operated dispensing means to cause direct communication between the pump means and the one chamber of said hollow body.

3. The apparatus as claimed in claim 2 wherein mechanical stop means are provided to limit the extent of movement of said piston within said hollow body.

4. The apparatus as claimed in claim 2 wherein mechanical stop means are provided to limit the extent of movement of said piston within said hollow body, said stop means comprising hook lever means arranged to engage the manually operated dispensing means whereby to maintain same in delivery condition, first contact means connected to said piston for movement therewith, a stepped member adapted to be selectively interposed between said contact means and said lever means, said contact means being movable with said piston to engage said stepped member and urge the same against the lever and thereby release said manually operated dispensing means.

5. The apparatus as claimed in claim 1 in which said control means comprises fluid switch means operable to direct the flow of fluid from the pump to one or the other of said chambers, stop means coupled to said piston and ridable therewith during movement thereof, a stepped member adapted to be selectively interposed in the path of said stop means, said linkage means coupled to said manually operated dispensing means and arranged to be engaged with said dispensing means for maintaining same in delivery condition and to be engaged by said stepped member when said stepped member is urged thereagainst by said stop means for releasing said dispensing means to permit assumption thereby of the non-delivery condition.

6. The apparatus as claimed in claim 1 in which said dispensing head includes an intermediate chamber of predetermined volume adapted to be filled subsequent to delivery of hot infusion fluid to said coffee powder whereby to permit raising of the internal fluid pressure upon said coffee powder to a level sufficient to discharge the coffee beverage therefrom, said volume being related to the period of time preselected to insure proper infusion and percolating of said infusion fluid through the coffee powder.

7. The apparatus as claimed in claim 1 in which fluid switch means is provided selectively to direct the flow of cool fluid into one or the other of said chambers.

8. In a coffee-making machine which includes at least one delivery cock, each delivery cock being coordinated with a receptacle, a common source of fluid, pump means connected to said common source and having the delivery pipe end thereof connected to each receptacle, means for the heating of the contents in each receptacle, each receptacle having a hand operated delivery cock, a filter for holding coffee powder and communicating under seal with each receptacle, a volumetric metering device comprising two chambers separated by a moving wall and inserted in the delivery pipe on the inlet side of the said receptacle, means linked to the manual operating mechanism of the delivery cock, to control the moving wall, manually operated means to regulate and limit the travel of said moving wall, said manually operated means capable of being linked to the operating mechanism of the said delivery cock, whilst the operation of the delivery cock operates to close and open the electrical circuit of the pump.

9. Apparatus according to claim 8 wherein each of the said chambers has a pipe connecting them either with the delivery end of the pump, or with the receptacle, and said means linked to the operating mechanism of the delivery cock to control the position of the moving wall, comprises a stop valve on the common part of the said pipes.

10. Apparatus according to claim 8 in which the two separate chambers of the moving wall form chambers of a differential cylinder, one chamber having a smaller cross section being connected to the delivery side of the pump, to a valve connecting said one chamber to the other chamber of the cylinder and to the receptacle, said valve being linked to the operating mechanism of the delivery cock, a differential piston in said cylinder and means for varying and limiting the travel of the moving wall of the differential cylinder consisting of a variable distance piece arranged to move between a contact piece movable with the differential piston and a two-armed lever to catch and release the operating mechanism of the delivery cock.

11. A device in accordance with claim 10 in which the stop valve is held in the open position by an elastic force, against which operates the opening mechanism of the delivery cock in its movement from the position in which the delivery cock is closed to that in which the delivery cock is opened.

12. A device in accordance with claim 11 and a moving catch between the operating mechanism of the delivery cock and the wedge for closing the valve, said catch being provided in a guide manually movable in the transverse direction from its interposed position to render impossible the operation together of the operating mechanism and the valve.

References Cited

UNITED STATES PATENTS 3,278,087  10/1966  Stasse _____ 99—302 X

FOREIGN PATENTS 899,997    9/1944  France.
1,289,775  2/1962  France.
617,694    2/1961  Italy.

WILLIAM I. PRICE, *Primary Examiner.*